United States Patent [19]

Oberth

[11] 4,038,113
[45] July 26, 1977

[54] CATALYST SYSTEM FOR POLYURETHANE PROPELLANTS

[75] Inventor: Adolf E. Oberth, Fair Oaks, Calif.

[73] Assignee: The United States of America as represented by the Secretary of the Air Force, Washington, D.C.

[21] Appl. No.: 716,306

[22] Filed: Aug. 20, 1976

[51] Int. Cl.² .......................................... C06B 45/10
[52] U.S. Cl. .................................. 149/19.4; 252/430; 260/77.5 AB
[58] Field of Search ..................... 149/19.4; 252/430; 260/2.5 AB, 77.5 AB

[56] References Cited

U.S. PATENT DOCUMENTS

| | | |
|---|---|---|
| 3,332,887 | 6/1967 | Endler .......................... 252/430 X |
| 3,515,700 | 6/1970 | Yokouchi et al. ............ 252/430 X |
| 3,776,862 | 12/1973 | Boor ............................... 252/430 X |
| 3,884,849 | 5/1975 | Molbert ....................... 260/2.5 AB |

*Primary Examiner*—Leland A. Sebastian
*Attorney, Agent, or Firm*—Joseph E. Rusz; William J. O'Brien

[57] ABSTRACT

A two component catalyst system for use in promoting the cure of polyurethane propellants composed of zinc oxide as the first component and either acetylacetone, linoleic acid, α-bromotetradecanoic acid or p-toluensulfonic acid as the second component.

5 Claims, No Drawings

CATALYST SYSTEM FOR POLYURETHANE PROPELLANTS

STATEMENT OF GOVERNMENT INTEREST

The invention described herein may be manufactured and used by or for the Government for governmental purposes without the payment of any royalty thereon.

BACKGROUND OF THE INVENTION

This invention relates to curable propellant compositions and to a catalyst system for promoting their cure. In a more specific aspect, this invention concerns itself with a system for effecting the in situ formation of a catalyst during the isocynate curing of hydroxy terminated polybutadiene propellants.

solid propellant compositions are generally composed of an oxidizer and a finely divided fuel component. In addition, plastic, resinous or elastomeric materials are often utilized as a combination fuel and binder for holding the propellant mixture together before the combustion reaction takes place. Polyurethane materials provide excellent binder materials and are extensively employed in various solid propellant compositions.

Urethane propellants are normally cured at temperatures of 110°-135° F. However, reduction of the curing temperature to 70°-80° F would significantly reduce propellant bore strains and bond stresses in case bonded solid rocket motors. The lower cure temperature also results in better propellant mechanical behavior, because side reactions are also minimized at lower temperatures. Ambient temperature curing is doubly important for propellants containing energetic fuels for binder components, which may decompose during cure at higher temperatures. A considerable research effort, therefore, has evolved in an attempt to develop catalysts which promote the isocyanate-hydroxy reaction at room temperature under the conditions expected in a solid propellant environment. The catalyst must promote the isoycenate cure without seriously affecting propellant processing characteristics, mechanical behavior and storage stability.

A satisfactory balance between potlife and the time required for full cure is another major problem of ambient cure during which the accelerating effect of higher temperature on the urethane reaction cannot be utilized. This is particularly true for lithium initiated, hydroxy terminated polybutadiene (Li HTPB) prepolymer cured with a diisocyanate both NCO groups of which possess equal reactivity, for example hexamethylene diisocyanate. A conventional catalyst often employed in curing polyurethane is ferric acetylacetonate, an iron chelating agent, hereinafter designated $Fe(AA^1)_3$.

At catalyst levels as low as 0.001% $Fe(AA)_3$, however, the propellant mix will be castable for only 30 minutes in case of hexamethylene diisocyanate and somewhat longer for toluene diisocyanate cured propellants but still require 7-10 days for full cure. In the absence of a catalyst, Li HTPB propellants are practically uncurable (weeks at 180° F are required). Reduction of the catalyst level below 0.001% entails the danger of losing the catalyst in degradative reactions. For these reasons some effort was spend searching for a catalyst of moderate activity which could be used in larger concentrations.

A highly satisfactory catalyst system was developed to solve the problems encountered in the ambient curing of polyurethane binders and propellants. This system provides for the in situ formation of the catalyst during the curing reaction.

With the present invention, it has been found that the in situ formation of an effective catalyst during the curing reaction can be accomplished by using a mixture of zinc oxide and a diketone or an organic acid, such as linoleic, α-bromotetradeconoic or p-tolueresulfonic. This system has been proven to be effective for lithium initiated hydroxy terminated polybutadiene propellants and even more effective for free radical initiated, hydroxy-terminated polybutadiene propellants, such as R-45M. In R-45M propellants, owing to the large excess of hydroxyl groups over the NCO groups of the Li HTPB propellats, side reactions are minimized.

The important consideration of the catalyst system of this invention is to bring about a temporary delay of catalytic activity, to insure adequate pot life, followed by reactivation of the catalyst to promote and ensure an adequate cure in a reasonable length of time. The present catalyst system does not have any deleterious effects on processing, aging and/or mechanical properties of the resulting propellant. On the contrary batch fluidity and thus, castability, are at a maximum because polymerization is delayed to a later stage, and the resulting mechanical properties are as good as any obtained by alternate methods. In addition, these methods are rather flexible, in that they allow catalyst activity to be modified at any stage of propellant processing.

SUMMARY OF THE INVENTION

In accordance with the general concept of this invention, there is provided a catalyst system for promoting the ambient cure of polymethane based propellant compositions. The system strikes a satisfactory balance between pot life and the time required for a full cure in the cure catalysis of hydroxy terminated, polybutadiene (HTPB) propellants. The catalyst system comprises a mixture of zinc oxide and a second component selected from the group consisting of diketones and organic acids having a pKa of not more than 6. 2,4-pentanedione has been found to be an effective diketone component while linoleic, benzilic or p-toluenesulfonic have been found to be prefferred as the acid component.

Accordingly, the primary object of this invention is to provide a novel catalyst system for promoting the cure of polyurethane propellants using an isocyanate curative.

Another object of this invention is to provide a propellant catalyst that is capable of promoting the ambient temperature cure of polyurethane propellants without adversely affecting their aging, mechanical properties and processing procedures.

Still another object of this invention is to provide a catalyst system for promoting the ambient temperature cure of polyurethane propellants that achieves a satisfactory balance between pot life and the time required for a full cure.

The above and still other objects and advantages of the present invention will become more readily apparent upon consideration of the following detailed description thereof.

DESCRIPTION OF THE PREFERRED EMBODIMENTS

Pursuant to the above-defined objects, the present invention contemplates a catalyst system for promoting the cure of propellant compositions that utilize polyurethane as a combination fuel and binder component along with an isocyanate curative.

The key problem in the cure of hydroxy-terminated polybutadiene (HTPB) propellants is the achievement of adequate potlife in the presence of a catalyst, which will effect complete cure in a reasonable time. With a simple catalyst it is not possible to achieve this objective.

A good catalyst accelerates essentially the urethane reaction, i.e., the cure reaction proper, leaving side reactions like the water-isocyanate reaction comparatively unaffected. At higher levels of catalyst, therefore, the effects of side reactions are minimized and the overall state of cure and hence reproducibility as well as mechanical properties are improved.

The level of contaminants (moisture, etc.) in propellants may vary, depending on exposure to the environment and the characteristics of the propellant components which may not be known with the desired precision. While some of the contaminants may be neutralized by suitable scavengers, it is obviously good practice to minimize the cure time during which these substances can interfere with the urethane reaction. This cure time, unfortunately, must include a lengthy period, referred to as potlife (usually about 8 hours are required) during which the propellant batch must remain liquid in order to be cast into motor chambers. During this time, the propellant viscosity at all shear levels should not rise above 50,000 poise, to assure flawfree castings.

HTPB prepolymers have about the highest reactivity of any hydroxyl containing compound. Thus, in order to obtain the desired potlife the slower reacting isocyanates such as TDI, HDI, IPDI, (toluene diisocyanate, hexanediisocyanate, isophorone diisocyanate), etc. must be used. Aromatic isocyanates with unhindered NCO groups, or, even more so, electronegatively substituted isocyanates such as tetrafluoro-1,4-phenylene diisocyanate, are too fast, even uncatalyzed, to be applicable.

Even less reactive isocyanates, require low concentrations of the more effective catalysts or the propellant potlife is undesirably short. Slightly higher concentrations of moderately active catalysts can be used. However, the catalysts which are best in promoting the urethane reaction are also the mose active ones so that only very small catalyst concentrations are permissible. This poses an additional problem in that at low concentrations, the catalyst can be completely lost by hydrolysis or other degradative reactions.

With the present invention, however, it has been found that the aforementioned problems can be overcome by providing a catalyst system that achieves the in situ formation of the catalyst during the curing reaction. The catalyst is a two component system composed of zinc oxide as the first component and either a diketone, such as acetylacetone (HAA) or an organic acid, such as linoleic, benzilic or p-toluensulfonic.

In the approach of this invention, the catalyst for the urethane reaction is formed in the propellant medium in accordance with the following reactions:

$$ZnO + 2HAA \rightarrow Zn(AA)_2 + H_2O, \quad (1)$$
$$ZnO + 2RCOOH \rightarrow Zn(OOCR)_2 + H_2O. \quad (2)$$

In such a system the rate of cure is very slow during the initial stages but speeds up enormously as the acetylacetone is consumed. In this manner the dual effect of increasing catalyst concentration and decreasing suppressor concentration is obtained. To date, all attempts to use prior art ferric compounds in this approach have been unsuccessful. Only ZnO which converts to $Zn(AA)_2$ by HAA or PoO produced cure. Lead oxide, futhermore, is only converted into a chelate by the more acidic diketones, notably hexafluoroacetone. Much faster conversions are achieved with acids, of which p-toluenesulfonic acid, linoleic acid and α-bromotetradecanoic acid were tried. All of these increased the rate of cure. AnO and PbO were employed as metal donors. Propellants were prepared using either HDI as shown in Table I or TDI as curative as shown in Table II.

In the slower curing Li initiated propolymers this cure system has not been successful, even when elevated cure temperatures (135° F) were employed. Cure was very sluggish and also appeared to require a larger proportion of isocyanate. The reason for this behavior is probably that the zinc catalyst is not specific for the urethane reaction. In R-45M propellants, conventionally referred to as free initiates, hydroxy-terminated polybutadienes, owing to the large excess of hydroxyl groups over the NCO groups these side reactions are minimized, but in stoichiometrically cured lithium initiated HTPB, side reactions become appreciable during the last stages of cure, becauce the concentration of cure interfereing impurities becomes significant compared to the concentration of hydroxyl groups.

For Li HTPB systems, only p-toluenesulfonic acid in combination with ZnO resulted in a cured propellant but 3 weeks at ambient were required to promote a soft cure. Moreover, the exposed propellant surfaces showed extensive decomposition, probably, a result of moisture interference reactions, which depleted the NCO content and resulted in poor cure.

TABLE I

MECHANICAL PROPERTIES OF R45M/HDI
HIPB PROPELLANT CONTAINING 85 WT% SOLIDS
(Catalyst formed during cure)

| | Uniaxial Tensile Properties at 77° F[(b)(a)] | | | | | |
|---|---|---|---|---|---|---|
| | 7 days cure r.t. | | | 7 days r.t. 48 hrs. 180° F | | |
| Catalyst System | m psi | m % | Eo psi | m psi | m % | Eo psi |
| ZnO 0.1%, linoleic acid 0.008% | 121 | 40 | 420 | 123 | 48 | 395 |
| ZnO 0.1%, -bromotetradecanoic acid 0.08% | 110 | 35 | 396 | 120 | 42 | 387 |
| Zno 0.1%, p-toluenesulfonic acid 0.04% | 115 | 41 | 418 | 121 | 43 | 415 |

[(a)(b)] Standard JANAF tensile specimen. 0.74 min[−1]

TABLE II

MECHANICAL PROPERTIES OF R45M/TDI
PROPELLANTS CONTAINING 88WT% SOLIDS
(Catalyst Formed During Cure)

| | Uniaxial Tensile Properties at 77° F[(a)] | | | | | |
|---|---|---|---|---|---|---|
| | 7 days r.t. cure | | | 2 wks 160° F | | |
| | ,psi m | ,% m | E ,psi o | ,psi m | ,% m | E ,psi o |
| ZuO 0.1%, linoleic acid 0.5 mmole | 144 | 27 | 800 | 167 | 30 | 820 |
| PbO 0.1%, linoleic acid 0.5 mmole | | | | | | 1050 |
| Control, no catalyst | | | | | | 790 |

[(a)]Standard JANNAF tensile specimen. 0.74 min[−1]
[(b)]mmoles - millimoles per 400 g propellant.

Very little success was achieved with ferric compounds used in metal donors. Even with acids they hardly reacted. The ferric compounds tried were Fe₂-

$O_3$, freshly prepared FeO(OH), and a polymeric ferric carbonate.

Zinc oxide proved to be the best performer with diketones as well. Zinc acetylacetonate ($Zn(AA)_2$) is a good urethane catalyst in the absence of moisture. It can, therefore, be used in HTPB propellants where the moisture content is low. By contrast, $Zn(AA)_2$ is unsuitable in polyether prepolymers where the moisture content is high.

The ZnO-HAA system works best at slightly elevated temperatures. Table III shows the properties obtained with an 85 WT% solids R-45M/1DP/TDI/TEPAN binder system cured for 4 days at 110° F. A 10 day cure at ambient temperature was also conducted on a 10-lb propellant batch. R-45 is a free radical initiated, hydroxy-terminated polybutadiene, IDP is isodecyl pelargonate, TDI is toluene diisocyanate, and TEPAN is a bonding agent maufactured by the Aerojet Solid Propulsion Company of Sacramento, California.

TABLE III

FORMATION OF Zn CATALYST
IN PROPELLANT DURING CURE

| Pro-pellant | ZnO, %* | HAA* | HF AA* 6 | Cure Time, Days | ,psi m | ,% m | E ,psi o |
|---|---|---|---|---|---|---|---|
| 1 | 0.1 | 0.025 | — | 4 | 180 | 30 | 840 |
| 2 | 0.1 | — | 0.025 | 4 | 189 | 28 | 950 |
| 3 | 0.2 | — | 0.05 | 4 | 188 | 26 | 1000 |
| 4**** | 0.1 | 0.025 | — | 10 | 82 | 54 | 220 |

*Concentration based on propellant
**0.74 in./in./min. The high moduli, coupled with high tensile and low elongation are primarily due to an excess of the TDI curing agent.
***Ten-lb batch cured at ambient temperature.

While certain examples have been presented as illustrating the invention, it is to be understood that the invention is not to be limited thereto. Various modifications and alterations to the invention will be apparent to those skilled in the art to which the present invention pertains. Accordingly, all such modifications or alterations as fall within the scope of the of the appended claims are intended to be included herein.

What is claimed is:

1. A two-component catalyst stystem for promoting the cure of polyurethane propellant compositions which comprises zinc oxide as a first component and a second component selected from the group consisting of diketones and organic acids having a pKa of no more than 6.

2. A two-component catalyst system in accordance with claim 1 wherein said second component is acetylacetone.

3. A two-component catalyst system in accordance with claim 1 wherein said second component is linoleic acid.

4. A two-component catalyst system in accordance with claim 1 wherein said second component is α-bromotetradecanoic acid.

5. A two-component catalyst system in accordance with claim 1 wherein said second component is p-toluenesulfonic acid.

* * * * *